United States Patent [19]

Frost

[11] Patent Number: 4,518,718

[45] Date of Patent: May 21, 1985

[54] RIGID ZEOLITE CONTAINING POLYURETHANE FOAMS

[75] Inventor: Charles B. Frost, Livermore, Calif.

[73] Assignee: The United States of America as represented by the United States Department of Energy, Washington, D.C.

[21] Appl. No.: 611,772

[22] Filed: May 18, 1984

[51] Int. Cl.$^3$ .............................................. C08G 18/14
[52] U.S. Cl. .............................. 521/122; 204/159.14
[58] Field of Search .................... 521/122; 204/159.14

[56] References Cited

U.S. PATENT DOCUMENTS

| | | | |
|---|---|---|---|
| 3,235,089 | 2/1966 | Burroughs | 210/510 |
| 3,271,352 | 9/1966 | Weinberg | 521/122 |
| 3,326,844 | 6/1967 | Gruber | 521/122 |
| 3,545,622 | 12/1970 | Sakhnovsky et al. | 210/496 |
| 3,625,872 | 12/1971 | Ashida | 521/123 |
| 3,897,372 | 7/1975 | Kehr et al. | 521/123 |
| 4,036,360 | 7/1977 | Deffeyes | 428/309 |
| 4,108,791 | 8/1978 | Wasilczyk | 252/182 |
| 4,167,611 | 9/1979 | Czarnecki et al. | 521/122 |
| 4,276,404 | 6/1981 | Scholl et al. | 528/57 |
| 4,288,559 | 9/1981 | Illger et al. | 521/55 |
| 4,292,214 | 9/1981 | Blount | 523/400 |
| 4,296,211 | 10/1981 | Blount | 521/154 |
| 4,447,565 | 5/1984 | Lula et al. | 523/219 |

*Primary Examiner*—Maurice J. Welsh
*Attorney, Agent, or Firm*—Armand McMillan; Albert Sopp; Judson R. Hightower

[57] ABSTRACT

A closed cell rigid polyurethane foam has been prepared which contains up to about 60% by weight of molecular sieves capable of sorbing molecules with effective critical diameters of up to about 10 Å. The molecular sieve component of the foam can be preloaded with catalysts or with reactive compounds that can be released upon activation of the foam to control and complete crosslinking after the foam is formed. The foam can also be loaded with water or other flame-retarding agents, after completion. Up to about 50% of the weight of the isocyanate component of the foam can be replaced by polyimide resin precursors for incorporation into the final polymeric network.

16 Claims, 1 Drawing Figure

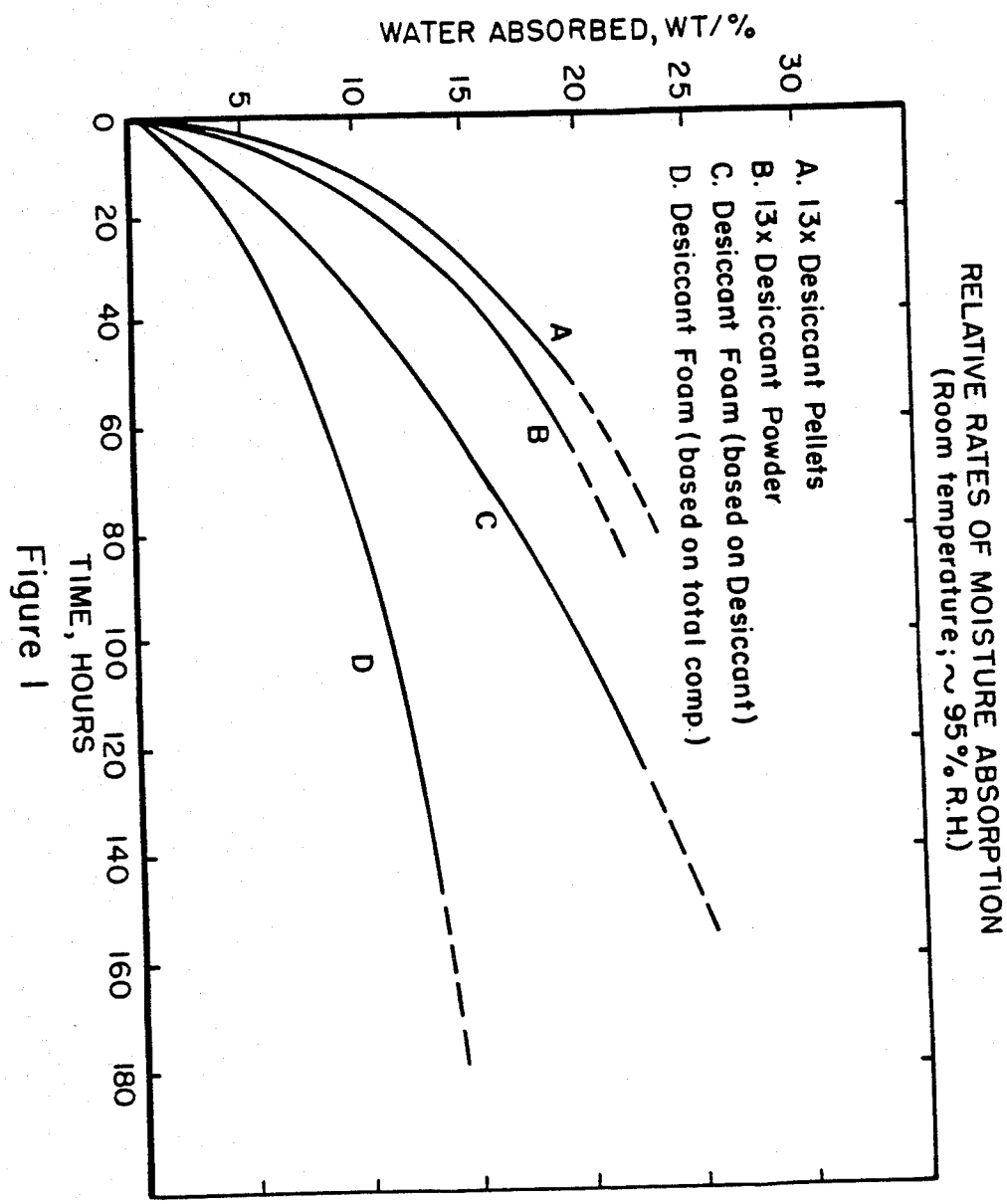

RIGID ZEOLITE CONTAINING POLYURETHANE FOAMS

The U.S. Government has rights in this invention pursuant to Contract Number DE-AC04-76DP00789 between the U.S. Department of Energy and AT & T Technologies, Inc.

BACKGROUND OF THE INVENTION

The present invention relates to rigid polyurethane foams with desiccating properties and to hybrid polyurethane-polyimide foams of similar character.

It is known that molded desiccant articles can be made from various desiccant materials in combination with binders. For example, molded blocks comprising a desiccant and an epoxy resin are disclosed in, e.g., U.S. Pat. No. 3,545,622 to Sakhnovsky et al. Such articles generally have a density of about 1 g/cc. Higher density structural desiccants can be made from molecular sieves, glass frit, and bentonite, as reported in, e.g., U.S. Pat. No. 3,235,089 to Burroughs.

Low density molded desiccant articles can also be made as a syntactic foam by blending a thermosetting resin, microspheres, and molecular sieve powder, then molding and curing the mixture. The resin used may be a polybenzimidazole, a polyphenylene, a phenolic, or a polyimide resin. The resulting articles, as disclosed by Lula et al. in U.S. Pat. No. 4,447,565, have densities of about 0.2 to 0.9 g/cc, moisture capacities of 1 to 12% by weight, and can serve as light weight structural supports. However, these excellent foam products are made with rather expensive resins, e.g. polyimides, by a process requiring relatively high temperature and isostatic pressures.

As to polyurethanes, there are many disclosures of such compositions with inorganic additives to affect various properties. For example, Illger et al. U.S. Pat. No. (4,288,559) add alumino-silicates to a polyurethane foam to improve structural stability and fire resistance. Alumina hydrate or silica is also used by Kehr et al. U.S. Pat. No. (3,897,372) for fire retardance. Gruber U.S. Pat. Nos. (3,325,844) and Weinberg (3,271,352), on the other hand, add zeolites to polyurethane lacquer and coating material to remove water from the reactants so that clear flawless film products are obtained. These compositions are neither foams nor desiccants nor do they possess any structural capabilities. Deffeyes U.S. Pat. No. (4,036,360) also adds at least 20% of a particulate desiccant, which may be zeolite, to a prepolymerized polyurethane which is then formed into strips to be inserted in packages for moisture adsorption. Heretofore, as Deffeyes notes, high desiccant-content resins were fragile.

OBJECTS OF THE INVENTION

An object of the present invention is to provide desiccant polyurethane foams with modified water sorption rates. Another object is to provide desiccant rigid polyurethane foam articles which can function as structural members. Still another object is to provide desiccant foams having improved thermal stability. A further object is to provide desiccant foams that can be molded into intricate shapes without resort to elaborate equipment, high temperatures, or high pressures.

Various other objects, features and attendant advantages of the present invention will be more fully appreciated as the same becomes better understood when considered in conjunction with the accompanying drawing.

SUMMARY OF THE INVENTION

In accordance with the present invention, there is now provided a new type of rigid closed cell polyurethane foam articles having improved properties such as excellent heat resistance and compressive strength, and a modified moisture adsorption capacity of up to about 18% by weight, achieved by incorporation of zeolite powder or pellets. Unlike the zeolite powder or pellets, or for that matter, prior art foams containing such, the foam of this invention possesses a usefully reduced moisture-adsorption rate which does not affect their overall adsorption capacity.

The foam of the invention may also contain advantageously a certain quantity polyimide resin and its zeolite component can be preloaded with catalysts or other substances that can react with the resin components present.

BRIEF DESCRIPTION OF THE DRAWING

FIG. 1 shows in graph form the relative moisture adsorption rates of the polyurethane foams of the invention as compared to the adsorption rates of zeolite materials which can be incorporated in these foams.

DETAILED DESCRIPTION OF THE INVENTION

The closed cell rigid polyurethane foam articles of this invention are made from known polyurethane components and molecular sieves having a pore size large enough to admit water molecules.

The polyurethanes are obtained in the conventional manner by the reaction of polyisocyanates with, e.g., hydroxyl-terminated polyesters or polyethers to form higher molecular weight prepolymers which may be chain-extended and crosslinked by difunctional compounds containing active hydrogen, such as water, glycols, diamines, aminoalcohols, and the like. The use of water leads to the evolution of carbon dioxide and to the conversion of isocyanate groups into amino groups. The latter groups react with further isocyanate groups to form substituted urea linkages in the polymer network. The carbon dioxide, on the other hand, acts as a blowing agent, causing the mixture to foam. However, in the presence of large quantities of molecular sieves or zeolites, as is the case in the present invention, all of the water is absorbed by these desiccants at the time foaming should occur. Consequently, satisfactory expansion of the reaction mixture is accomplished by incorporating into it alternate blowing agents such as the halocarbons commonly used as refrigeration gases, e.g., Freon 113.

Up to about 60% of the weight of the polyurethane foams of this invention can be constituted by molecular sieves. In practice and for most uses, the zeolite content lies within the range of about 10 to 60% by weight, with about 20 to 50% preferred. These molecular sieves or zeolites will be described later.

Water may be added to the foam-forming mixtures. Its initial presence, prior to sorption, is believed to increase the wetting and dispersing action of the silicone surfactant conventionally present in such preparations, thus facilitating the handling of the zeolite desiccant powder. The sorbed water, as well as any water that may have been actively preloaded into the desiccant, is liberated upon activation of the formed foam article, e.g., at about 350° F. for 3 hours in high vacuum, and reacts with an excess of free isocyanate groups in the foam to form substituted urea linkages. Since the foam is already rigid, the carbon dioxide produced and any excess water (over available isocyanate groups) are evolved without further foam expansion while new urea linkages increase the crosslink density of the material.

Reactants other than water may also be preloaded in the zeolite desiccant in order to improve the properties of the final polyurethane structure. It is well known that a common problem of all highly crosslinked polymer systems is the extreme difficulty experienced in attaining 100%, or near 100% completion of all the various complex and competing reactions involved. This is due in part to the polyfunctionality, $f$, of the reactants and the resultant early gelation and subsequent immobilization of the unreacted species in the growing polymer network. In the present molded desiccant foam, the polyol component typically has $f \simeq 6$ and the polyisocyanate, $f \simeq 2.8$. Yet, the reactions can be pushed to near completion by sorbing a low molecular weight and very mobile and reactive monomer, such as 1,4-butanediol, onto the desiccant. By doing this, a monomer which could normally be completely consumed in the early stages of the reaction, is maintained unreacted until the last stages of the reaction i.e., when it is most effective, and is released later by increasing the temperature during or after the initial cure. In this manner, more complete reactions are achieved with elimination or effective reduction in unreacted functional groups, resulting in improved thermal stability and aging properties and reduction in susceptibility to hydrolysis. In the molded desiccant foams of the invention, the customary excess of isocyanate groups over stoichiometry can thus be advantageously utilized upon liberation of sorbed reactant, e.g., 1,4-butanediol, during the foam's final activation treatment, typically 3 hours at about 350° F. in high vacuum.

Similarly, by preloading certain amines and low molecular weight epoxies in the desiccant, and releasing them during the foam activation stage, the trimerization of isocyanate groups to the far more thermally stable isocyanurate groups can be catalyzed effectively with significant elimination of undesirable side reactions.

For many applications, it is desirable to load the polyurethane foams with a maximum quantity of desiccant powder. The limiting factor for this loading is the viscosity of the dispersions of zeolite powder in the polyol and the isocyanate components of the foam matrix. It has now been found that the fluidity and the mixing of the two components can be greatly improved by pretreatment of the zeolite powder prior to dispersion into the two foam components. This pretreatment consists of the usual initial "baking out" of the desiccant, generally at 350° F. for roughly three hours under vacuum and, during the cool down—vacuum reduction period, pressurizing the 'activated' zeolite molecular sieves with a suitable readily sorbable gas such as $N_2$ or $CO_2$. Significant quantities of these gases can be sorbed even at ambient temperature. When the zeolite dispersions in the polyol and polyisocyanate components are made, the sorbed gas is released (apparently replaced by some other more polar polymer segments) and renders the dispersions more fluid. This reduction in viscosity carries over and greatly facilitates the final mixing of the two reactive loaded foam components.

The desiccants that can be used in the manner already mentioned are powdered solids possessing a substantial capacity for moisture adsorption. They are crystalline metal alumino-silicates, as disclosed, e.g., in U.S. Pat. No. 2,882,243, which is incorporated herein by reference. These molecular sieves or zeilite desiccants have pore sizes ranging from that of type 3A, which will sorb molecules with a critical diameter of up to 3 Å, e.g., $NH_3$, $H_2O$, $CH_3OH$, etc., to that of the relatively large type 13X which will sorb molecules with an effective diameter of up to 10 Å. Although all the various types of zeolites with pore sizes within the range just mentioned can and have been used in the foams of the invention, the larger pore size zeolites are preferred, since it is often desirable to remove, in addition to water, other extraneous materials in vapor form that are released in the internal atmosphere in which the rigid desiccant foams of the invention are used. The large pore size zeolites are also preferred where preloading with catalysts or flame retardants is desirable.

The preferred type 13X will now be discussed for illustrative purposes. It is a sodium alumino-silicate crystal. Type 13X has a nominal pore size of 10 Ångstroms (0.3 nm), which admits, as mentioned before, molecules such as water, ammonia and methanol, etc., and additional molecules having effective diameters of up to 10 Å, while excluding molecules with larger effective diameters. Typical properties of Type 13X powder desiccant are shown in Table 1.

TABLE 1

| Typical Properties of Type 13X Powder Desiccant | |
|---|---|
| Property | Value |
| Nominal Pore Diameter (Å) | 10 |
| Density (g/cm$^3$) | |
| Hydrated Wet | 1.95 |
| Activated Dry | 1.53 |
| Particle Diameter ($\mu$) | <10.0 |
| Weight (Percent)* | |
| Equilibrium H$_2$O Capacity | 34 |
| Water Content (as shipped) | ≦2.5 |

*Grams H$_2$O/100 grams activated desiccant at 17.5 mm Hg and 25° C.

The zeolite desiccants just described cannot only be loaded with water or other useful crosslinking or catalytic substances which affect the ultimate structure of the polymer network, but also can be loaded with many substances which alter the final properties and end uses of the foams. Thus, the enhanced flame resistance of polyurethane foams obtained by the replacement of, e.g., 50 weight percent of the organic phase with noncombustible inorganic zeolite phase, can be further improved by loading the zeolite with sorbed water, up to about 30% by weight based on the desiccant, after foam curing. Obviously, no activation step is carried in such cases. Still greater flame retardancy can be achieved by sorbing, in the same manner, known special retardants such as Celluflex CEF, $(ClCH_2CH_2O)_3PO$.

Specific embodiments will now be described to illustrate, but not to limit, the invention as defined in the appended claims.

In these examples, all temperatures, parts and percentages are set forth in degrees fahrenheit and on a weight basis, as applicable.

EXAMPLE 1

A molded desiccant foam containing 50% zeolite molecular sieves and 50% polyurethane matrix was prepared from the following components:

| Constituents | Parts (wt.) |
| --- | --- |
| Polyol Component: | |
| Hexafunctional polyol, LS-490 | 100 |
| Water (optional) | 0.3 |
| Silicone surfactant, DC-193 | 3 |
| Tetramethylbutane diamine catalyst | 0.2 |
| | 103.5 |
| Zeolite 13X powder | |
| Trichlorotrifluoroethane, Freon 113, 10 to 15 | |
| Isocyanate Component: | |
| Polyaryl polyisocyanate, PAPI-135 | 150 |
| Silicone surfactant, DC-193 (optional) | 3 |
| | 153 |
| Zeolite 13X powder | |
| Trichlorotrifluoroethane, Freon 113, 10 to 15 | |

All the above ingredients are commercial materials: LS-490 is a hexafunctional polyol composed of the product of the propylene oxide addition to sorbitol with an equivalent weight of 114 (Union Carbide).
DC-193 is an organosilicone surfactant from Union Carbide. 13× zeolite powder, described above, is obtained from the Linde Division of Union Carbide. PAPI-135 is a polyary polyisocyanate with a functionality of ca 2.8 and an equivalent weight of 134 (Upjohn).

After complete mixing and dispersion of the ingredients, the two components of the foam were mixed together and placed in a mold to obtain a formed desiccant foam of the desired shape.

Due to the relatively high viscosity of the zeolite-loaded components, the final combining of said components was carried with high speed agitation without previous heating and the resulting mixture was quickly poured into a conventional metal mold preheated to a temperature of about 120° F. All the processing equipment used was conventional, but special efforts were made to insure thorough and rapid mixing of the high viscosity zeolite dispersions in order to obtain a homogeneous foam product.

EXAMPLE 2

Another molded desiccant foam was prepared with the ingredients and in the manner of Example 1, with the exception that the loading of the zeolite desiccant was increased to 60% of the total formulation weight by the use of a blend of spheres (0.0625" diameter) and fine powder ($\leq 10$ microns):

| | Parts (wt) |
| --- | --- |
| 13X powder molecular sieves | 95.1 |
| 13X spherical molecular sieves | 285.2 |
| | 380.3 |

This mixture was distributed between the polyol and the polyisocyanate components as in the formulations of Example 1.

EXAMPLE 3

In an attempt to upgrade the thermal stability of polyurethane systems, it was discovered that certain solid polyimide polymer precursors are soluble in isocyanates, e.g., PAPI-135, a polyaryl polyisocyanate with a f of 2.8. A hybrid desiccant foam of this type was prepared as follows:

Polyol Component

The same as that of Example 1, water included.

Isocyanate Component

| | Parts (wt) |
| --- | --- |
| Polyaryl polyisocyanate, PAPI-135 | 150 |
| Polyimide precursors, K-601 | 150 |

K-601 is a solid powder mixture of reactive polyimide precursors, marketed as a high temperature molding powder by the Rhodia Division of Rhone Poulenc, Inc. It will be described further below. All the other ingredients of the hybrid foam formulation have been described in Example 1.

To prepare the zeolite-loaded hybrid foam, the constituents of the polyol phase were blended and the 13× powder dispersed into the blend. The Freon 113 was added last, just before the final combination of the two component mixtures. For the isocyanate phase, the polyimide precursors powder was dissolved in the isocyanate, with the Freon again added just prior to the final mixing. The two phases were then combined, molded and cured under the same conditions as the molded desiccant polyurethane foam of Example 1. Excellent thermal and desiccant properties were achieved, as discussed in the table and the text below.

The polyimide systems that can advantageously be incorporated in polyurethane foams in the manner just described are preferably those that cure by addition reaction and without outgassing. Illustrative of these materials is Kerimid 601, used in above Example 3, a fully imidized powder of the type described in U.S. Pat. No. 3,562,223, which is incorporated herein by reference. K-601 contains a bis-maleimide, i.e., 4,4'-bis-maleimido-diphenyl methane (BMI) as its major constituent. It also has some methylene dianiline (MDA), in minor proportion, and at least four adducts of BMI/MDA, in appreciably lesser quantities. When the polyimide precursors mixture is dissolved in the liquid polyisocyanate of the hybrid foams, it is the MDA component that reacts with both the polyisocyanate and the bis-maleimide (BMI), thus forming the essential link between the polyimide and the polyurethane networks. Hybrid polymeric compositions of this nature, with or without zeolite loading, thus provide a convenient way to obtain improved heat resistant foams for structural applications, without recourse to the more sever curing conditions generally associated with the preparation of polyimid resins.

Turning now to the graph in FIG. 1, it becomes evident by a comparison of curves A and B with curves C and D that no loss of moisture adsorption capacity is suffered by the zeolite (curves A and B) once incorporated into the rigid closed cell halogenated hydrocarbon-containing foams of the invention (curves C & D). It is also apparent, however, that the rate of adsorption of moisture by the desiccant-containing foams (curves C and D) is lower than that of the free zeolite components (curves A and B), an advantageous modification that allows more time in handling the foam articles before final placement and renders the use of a protective coating, such as Parylene, unnecessary.

The structural properties of the foams of the invention can be visualized from the data in the following table.

| PROPERTIES OF DESICCANT FOAMS | | | |
|---|---|---|---|
| Foam Type | Heat Distortion Temp. | Compressive Modulus, psi | Compressive Strength, psi |
| Rigid Polyurethane Control | 262° F. | 92,900 (@ 68° F.) | 3,100 (@ 68° F.) |
|  |  | 6,700 (@ 350° F.) | 950 (@ 350° F.) |
| Molded Desiccant Foam | 354° F. | 169,900 (@ 68° F.) | 6,500 (@ 68° F.) |
|  |  | 45,700 (@ 350° F.) | 2,000 (@ 350° F.) |
| Hybrid PI/PU Desiccant Foam | 352° F. | 97,800 (@ 68° F.) | 5,800 (@ 68° F.) |
|  |  | 32,300 (@ 350° F.) | 2,200 (@ 350° F.) |

Heat distortion per ASTM D648
Densities normalized to 0.8 g/cm$^3$
Test specimens molded to size, all with identical cure cycles.

As the table figures indicate, the molded desiccant foam of the invention has excellent mechanical strength and thus can also function as a structural member. Its properties both at ambient and elevated temperatures are superior to the unloaded polyurethane foam control, as shown by the doubling in compressive strength and the significantly higher heat distortion temperature values.

The improvement in heat distortion temperature of over 100° F. (i.e., 354° F. as compared to 262° F.) as determined per ASTM procedure D-648 (under 264 psi fiber stress) cannot be attributed solely to the reduction in organic content and its replacement by inorganic zeolite, since another foam formulation, in which 25 weight percent glass microballoons were substituted for the 50 weight percent zeolite in the table composition (lower weight percent inorganic but similar volume loading), did not show the marked improvement in thermal stability and heat distortion. The reinforcement of the foams was unexpected since the particle size of the preferred grade of zeolite used (13× powder) was essentially 10 microns. This is far larger than, for example, the fine carbon black (30 to 100 nm) typically used for rubber reinforcement. The chemical composition of the 13× zeolite is that of an alkali metal alumino-silicate, $Na_{86}[(AlO_2)_{86}(SiO_2)_{106}] \cdot xH_2O$, with nothing inherent in its chemistry that would indicate potential mechanical or thermal property reinforcement.

It has also been observed that the adhesive strength of the desiccant foams of the invention is quite pronounced, as noted for instance by the behavior of residual foam mixtures in the stainless steel mixer used for foam preparation. Such observations have been confirmed by the preparation of metal-to-metal and metal-to-foam test coupons possessing strong adhesive bonding.

In another test, performed for measurement of thermal resistance to a high temperature heat pulse, a small quartz plate heated to 1100° F. is held in contact with a block of molded rigid foam for times as long as 10 seconds. In such a test, the molded desiccant polyurethane foam withstood the contact with little evidence of surface decomposition and little gas evolution. The polyurethane foam control, in contrast, charred on the surface and emitted a large quantity of smoke. The improvement is even greater in those desiccant foams loaded with water destined to uses where fire retardancy is intended.

From the foregoing description, one skilled in the art can easily ascertain the essential characteristics of this invention, and without departing from the spirit and scope thereof, can make various changes and modifications of the invention to adapt it to various uses and conditions.

What is claimed is:

1. A process for the preparation of a closed cell rigid polyurethane foam by mixing intimately a polyol component with an isocyanate component and curing the resulting mixture, comprising:
   (a) dispersing into each component finely divided zeolite capable of sorbing molecules with effective critical diameters of up to about 10 Å, said zeolite constituting up to about 60% of the final foam weight; and
   (b) adding a blowing agent to each component before combining said components.

2. The process of claim 1 wherein the blowing agent is a halocarbon refrigeration gas.

3. The process of claim 1 wherein the zeolite is preloaded with a substance that can react with the foam after the latter is formed.

4. The process of claim 3 wherein the preloaded substance is water.

5. The process of claim 3 wherein the preloaded substance is a small polyfunctional active hydrogen-containing molecule.

6. The process of claim 5 wherein the polyfunctional molecule is 1,4-butanediol.

7. The process of claim 3 wherein the preloaded substance is a catalyst for the trimerization of isocyanate groups.

8. The process of claim 1 wherein a mixture of polyimide precursors constituting up to 50% of the isocyanate component weight is dissolved in said component.

9. The process of claim 1 wherein an unreactive gas is sorbed into the zeolite before dispersion.

10. The process of claim 9 wherein the gas is $CO_2$ or $N_2$.

11. The process of claim 1 wherein the foam is activated by means of microwave energy.

12. A foam prepared by the process of claim 1.

13. A foam prepared by the process of claim 3.

14. A foam prepared by the process of claim 7.

15. A foam prepared by the process of claim 8.

16. A closed cell polyurethane foam comprising up to about 60% by weight of a zeolite capable of sorbing molecules with effective diameters of up to 10 Å, wherein 40% of the weight of the polyurethane has been replaced with polyimide resin precursors interpolymerized with said polyurethane.

* * * * *